United States Patent Office 3,536,472
Patented Oct. 27, 1970

3,536,472
LIQUID FERTILIZERS
Raymond Anthony Smith, Burton upon Trent, and John Thomas Dixon, Smethwick, England, assignors to Albright & Wilson Limited, Oldbury, near Birmingham, England, a British company
No Drawing. Filed Feb. 13, 1967, Ser. No. 615,332
Int. Cl. C05f 13/00
U.S. Cl. 71—27                9 Claims

ABSTRACT OF THE DISCLOSURE

A liquid fertilizer composition which comprises as nutrient ingredients compounds of potassium and phosphorus and trace elements, and has also present therein (i) a phosphonic acid of the general formula:

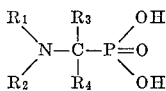

wherein $R_1$, $R_2$, $R_3$, and $R_4$ are each hydrogen or alkyl groups and may be the same or different, or $R_1$ and/or $R_2$ may be

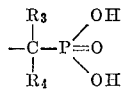

or alkyl ether groups or (ii) a water soluble alkali metal or ammonium salt or acid ester of said phosphonic acid.

---

The present invention relates to liquid fertilizers containing potassium and trace elements.

Liquid fertilizers containing nitrogen and phosphorus, usually in the form of ammonia, urea and $P_2O_5$ in aqueous solution, are finding increasing use. Where land has been intensively farmed it is customary to add potassium, usually as potassium chloride or sulphate, to the fertilizer. In all cases it is desirable to incorporate small amounts of certain trace elements such as manganese, copper, cobalt and molybdenum in the fertilizer. However, such trace elements give rise to precipitates when added to liquid fertilizer compositions and it has been proposed to add a complexing agent to the composition to prevent this precipitation. Where the composition does not contain potassium it has proved possible to prevent the precipitation by the addition of such complexing agents as polyphosphates. However, where the composition contains potassium it has not proved possible or commercially feasible to prevent the formation of precipitates by the use of the complexing agents hitherto proposed.

We have now found that certain phosphonic acids may be used successfully to reduce the formation of precipitates upon addition of trace elements of liquid fertilizer compositions containing both phosphorus and potassium. Whilst the phosphonic acids for present use have been disclosed as possessing sequestrant properties, it is most surprising that they should be successful in preventing the formation of precipitates in the liquid fertilizers of the invention in view of the fact that other complexing agents of a similar structure have been found to be ineffective.

Accordingly the present invention provides a liquid fertilizer composition which comprises as nutrient ingredients potassium, phosphorus and trace elements and has also present a phosphonic acid of the general formula

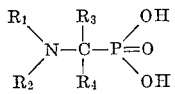

wherein $R_1$, $R_2$, $R_3$ and $R_4$ are each hydrogen or alkyl groups and may be the same or different, or $R_1$ and/or $R_2$ may be

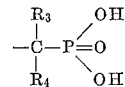

or alkyl ether groups; or water soluble salts or acid esters thereof.

The phosphonic acids for present use have the general formula set out above. Suitable acids include those wherein the R groups are lower alkyl groups such as methyl, ethyl, propyl or butyl groups, though the $R_1$ and $R_2$ groups may also be long chain alkyl groups containing ether linkages. However, it is preferred that the $R_3$ and $R_4$ groups be hydrogen and that the $R_1$ and $R_2$ groups are each

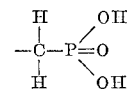

groups.

In place of the acids for present use, there may be used the water soluble salts or esters thereof. Preferred salts are alkali metal, especially the potassium, or ammonium salts, though mixed salts of one or more cations or mixtures of salts may also be employed. Where the esters are employed, it is necessary to use those having at least one free P—OH group and it is preferred to use those esters derived from short chain alcohols such as methyl, ethyl or propyl alcohols, in order to provide the desired degree of water solubility.

The phosphonic acids of the preferred structure may be readily prepared by reacting ammonia, or a primary or secondary amine, with phosphorous acid and an alkehyde or ketone. An especially preferred method for preparing the phosphonic acids for present use is that described and claimed in U.K. specification No. 1,023,785.

The phosphonic acids of the invention may be used alone or in admixture with alkylidene diphosphonic acids.

The liquid fertilizer compositions of the invention contain phosphorus and potassium as nutrient ingredients. The potassium may be provided by potassium salts such as potassium chloride, sulphate, or nitrate. Potassium compounds, such as potassium hydroxide, may be used if their added cost is warranted. The nutrient phosphorus may be provided, as is conventional, by the use of phosphoric acid or its water soluble salts. The acid employed may be substantially pure (that is thermal) phoshoric acid, or may be the impure phosphoric acid obtained by the action of a mineral acid upon phosphate rock (that is wet process phosphoric acid).

In addition to the nutrient potassium and phosphorus ingredients, the fertilizer composition may also contain other conventional fertilizer ingredients. Preferably the composition also contains appreciable amounts of nitrogenous materials. This may be achieved by the incorporation of urea, ammonia and ammonium salts, such as ammonium phosphate, or nitrate salts.

The ability of the phosphonic acids of the invention to inhibit the deposition of precipitates from the fertilizer compositions of the invention is exhibited over a wide range of pH values and the fertilizer compositions are usually substantially neutral.

The fertilizer compositions of the invention also contain trace element plant nutrients. These trace elements may be those commonly used, for example, salts and compounds of molybdenum, cobalt and manganese.

The relative amounts of nutrient and trace element ingredients and also the amount of water used are those commonly employed. The amount of phosphonic acid which is present in the composition will depend upon the amount of precipitatable material present in the composition. Where substantially pure ingredients are employed, the precipitatable material is solely the trace element ingredient. However, we have found that where wet process phosphoric acid is used, the phosphonic acids for present use are also effective in inhibiting the precipitation of the materials present as impurities in wet process acid. Therefore, where wet process acid is employed in the preparation of the present fertilizer compositions the amount of phosphonic acid employed is greater than that required to reduce precipitation of the trace elements. The precise amount of phosphonic acid which is to be added to the fertilizer composition may be readily determined by analysis of the ingredients thereof or, more preferably, by simple trial and error. Usually the amount of phosphonic acid employed is that required to secure a precipitate-free solution. However, in some cases it may be possible to utilise liquid fertilizer compositions of the invention having a small amount of precipitated matter therein. The use of an excess amount of phosphonic acid usually leads to no advantage.

The fertilizer compositions of the invention may be prepared in known manner, for example, by mixing solutions, preferably aqueous solutions, of the nutrient ingredients and adding the trace element and phosphonic acid ingredients thereto. Whilst the phosphonic acids may be added at any point during or after the mixing of the other ingredients, for example before or after the addition of the trace elements thereto, it is preferred to add the phosphonic acids to the phosphoric acid employed in the preparation of the fertilizer composition.

The invention will now be illustrated by the following examples in which all parts are by weight:

EXAMPLE 1

Thermal phosphoric acid (92.3 parts, S.G. 1.75) was mixed with water (384 parts) containing copper sulphate pentahydrate (8 parts), manganese chloride tetrahydrate (18 parts) and amino-tris(methylene phosphonic) acid (25 parts). This solution was then neutralised with ammonia (30% w./w. aqueous solution, 96 parts) to give a solution having a pH of 7. To the neutral solution were added urea (250 parts) and potassium chloride (27 parts) to give a liquid fertilizer composition containing 14% w./w. nitrogen, 6% w./w. phosphorus pentoxide and 8% w./w. potash. The fertilizer remained clear and free from solids, even after storage for one year at 20° C.

By way of comparison a fertilizer composition was prepared as above, except that the amino-tris (methylene phosphonic) acid was omitted. In this case a thick brown precipitate was rapidly formed when the phosphoric acid was neutralised with ammonia and the final product after addition of the potassium chloride was a brown slurry from which the solids settled gradually and was totally unsuitable for application by spraying. However, the slurry was clarified by the addition of amino-tris (methylene phosphonic) acid (25 parts) thereto.

EXAMPLE 2

Copper sulphate pentahydrate (8 parts), cobalt sulphate hexahydrate (20.5 parts), 1, hydroxyethylidene diphosphonic acid (24 parts) and amino-tris (methylene phosphonic) acid (24 parts) were dissolved in water (405 parts). To this solution was then added gypsum process phosphoric acid (139 parts, 80.5% w./w. $P_2O_5$). The mixture was then neutralised to a pH of about 7 with 30% w./w. aqueous ammonia solution. To the neutralised solution were added urea (94 parts) and potassium chloride (174.5 parts) to give a liquid fertilizer solution of composition 7% w./w. nitrogen, 7% w./w. phosphorus pentoxide and 11% w./w. potash. The liquid fertilizer solution remained clear and free from solids, even after storage for 6 months at 20° C.

EXAMPLE 3

Copper sulphate pentahydrate (8 parts) and cobalt sulphate heptahydrate (20.5 parts) were dissolved in water (325 parts) the solution was then mixed with gypsum process acid (120 parts, 29.7% w./w. $P_2O_5$) and a polyphosphoric acid (25 parts, 84% w./w. $P_2O_5$). The mixture was then neutralised, with cooling, to a final pH of 7 by the addition of 30% w./w. aqueous ammonia solution. At this stage the solution was clear. However, upon addition of urea (94 parts) and potassium chloride (174.5 parts) to give a liquid fertilizer containing 7% w./w. nitrogen, 7% w./w. phosphorus pentoxide and 11% w./w. potash, a precipitate was formed. The amount of precipitate increased on standing for 3 days at ambient temperatures and the solution was unsuitable for application by spraying.

The addition of amino-tris (methylene phosphonic) acid (30 parts) clarified the solution and rendered it suitable for application by spraying.

EXAMPLE 4

Diammonium phosphate (170 parts) which had been prepared from thermal process phosphoric acid, urea (116 parts), potassium chloride (143 parts), copper sulphate pentahydrate (8 parts), manganese chloride tetrahydrate (18 parts) and amino-tris(methylene phosphonic) acid (40 parts) were dissolved in water (505 parts). The resultant liquid fertilizer solution contained 8% w./w. nitrogen, 9% w./w. phosphorus pentoxide and 9% potash and remained free from precipitates when stored for one year at 20° C.

We claim:
1. A liquid fertilizer composition which comprises as nutrient ingredient compounds of potassium and phosphorus and trace elements, and has also present therein (i) a phosphonic acid of the general formula:

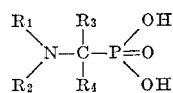

wherein $R_1$, $R_2$, $R_3$, and $R_4$ are each hydrogen or alkyl groups and may be the same or different, or $R_1$ and/or $R_2$ may be

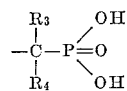

or alkyl ether groups or (ii) a water soluble alkali metal or ammonium salt or acid ester of said phosphonic acid.

2. A liquid fertilizer composition as claimed in claim 1 wherein each $R_3$ and $R_4$ group is a hydrogen group and each $R_1$ and $R_2$ group is a

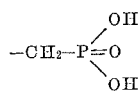

group.

3. A composition according to claim 1 wherein said phosphorus is phosphoric acid or a salt thereof.

4. A composition according to claim 1 wherein said trace element is molybdenum, cobalt, copper or manganese.

5. A composition according to claim 1 wherein the composition also contains nitrogenous nutrient components.

6. A composition according to claim 1 wherein the phosphonic acid is present in at least sufficient amount to inhibit precipitation due to the presence of both the trace elements and the impurities present in any ingredient of the compositions.

7. The composition of claim 4 containing said phosphonic acid.

8. The composition of claim 4 containing a water soluble alkali metal or ammonium salt of said phosphonic acid.

9. The composition of claim 4 containing said water soluble acid ester of said phosphonic acid.

References Cited
UNITED STATES PATENTS

| | | | |
|---|---|---|---|
| 2,917,528 | 12/1956 | Ramsey et al. | 71—1 X |
| 3,403,992 | 10/1968 | Busch | 71—1 |

REUBEN FRIEDMAN, Primary Examiner

R. BARNES, Assistant Examiner

U.S. Cl. X.R.

71—1, 32